(12) United States Patent
Goodyear et al.

(10) Patent No.: US 10,911,417 B2
(45) Date of Patent: Feb. 2, 2021

(54) METHOD AND SYSTEM FOR PROCESSING DATA PACKAGES

(71) Applicant: Egress Software Technologies IP Limited, London (GB)

(72) Inventors: John Goodyear, Sheffield (GB); Anthony Robert Pepper, London (GB); Neil Tony Larkins, London (GB); Nathan Michael Pilkington, Sheffield (GB)

(73) Assignee: Egress Software Technologies IP Limited, London (GB)

( * ) Notice: Subject to any disclaimer, the term of this patent is extended or adjusted under 35 U.S.C. 154(b) by 0 days.

(21) Appl. No.: 16/749,549

(22) Filed: Jan. 22, 2020

(65) Prior Publication Data
US 2020/0259801 A1 Aug. 13, 2020

(30) Foreign Application Priority Data

Feb. 7, 2019 (GB) .................................. 1901736.7
Feb. 7, 2019 (GB) .................................. 1901737.5
Feb. 7, 2019 (GB) .................................. 1901738.3

(51) Int. Cl.
*H04L 29/12* (2006.01)
*H04L 29/06* (2006.01)
(Continued)

(52) U.S. Cl.
CPC ......... *H04L 63/0428* (2013.01); *G06N 7/005* (2013.01); *G06N 20/00* (2019.01);
(Continued)

(58) Field of Classification Search
CPC ........................... H04L 63/0236; H04L 69/22
See application file for complete search history.

(56) References Cited

U.S. PATENT DOCUMENTS 7,010,681 B1   3/2006 Fletcher et al.
7,743,260 B2 * 6/2010 Fetik ..................... G06F 21/552
                                                        713/193
(Continued)

FOREIGN PATENT DOCUMENTS

JP    2006268218 A    10/2006
JP    2015230553 A    12/2015
(Continued)

OTHER PUBLICATIONS

"How to postpone Windows updates—Microsoft Community", 5 pages, printed Jul. 27, 2020. (Year: 2020).*

(Continued)

*Primary Examiner* — Ponnoreay Pich
(74) *Attorney, Agent, or Firm* — EIP US LLP

(57) ABSTRACT

A method for analysing data received by an addressed recipient of a data package. The method comprises receiving a data package over a data network. The data package comprises a header and payload data. The header of the data package is analysed to determine a plurality of characteristics, the characteristics comprising at least an identifier and a transmission time. The method also comprises generating a risk indicator, wherein the risk indicator indicates a risk associated with the analysis of the header. A handling action is generated based on the risk indicator; and provided along with the payload data to the addressed recipient.

16 Claims, 7 Drawing Sheets

(51) Int. Cl.
  *G06N 20/00*  (2019.01)
  *G06N 7/00*  (2006.01)
  *H04L 12/861*  (2013.01)
  *H04L 29/08*  (2006.01)

(52) U.S. Cl.
  CPC .......... *H04L 49/90* (2013.01); *H04L 67/1095* (2013.01); *H04L 67/1097* (2013.01); *H04L 69/22* (2013.01); *G06Q 2220/10* (2013.01)

(56) References Cited

U.S. PATENT DOCUMENTS

| | | | | |
|---|---|---|---|---|
| 8,312,548 | B1* | 11/2012 | Cnudde | G06F 21/56 726/24 |
| 8,566,938 | B1 | 10/2013 | Prakash et al. | |
| 9,800,590 | B1* | 10/2017 | Gates | H04L 63/1408 |
| 10,673,880 | B1* | 6/2020 | Pratt | H04L 63/1416 |
| 2002/0184619 | A1* | 12/2002 | Meyerson | G06F 21/51 717/173 |
| 2005/0182949 | A1* | 8/2005 | Phillips | H04L 63/02 713/189 |
| 2005/0183138 | A1* | 8/2005 | Phillips | H04L 63/0263 726/11 |
| 2010/0046378 | A1* | 2/2010 | Knapp | H04L 41/0604 370/242 |
| 2010/0121916 | A1* | 5/2010 | Lin | H04L 67/16 709/203 |
| 2012/0174226 | A1* | 7/2012 | Nazarov | G06F 21/56 726/24 |
| 2012/0191631 | A1* | 7/2012 | Breckenridge | G06N 20/00 706/12 |
| 2012/0284212 | A1* | 11/2012 | Lin | G06N 20/00 706/12 |
| 2013/0110750 | A1* | 5/2013 | Newnham | G06N 20/00 706/12 |
| 2014/0156568 | A1* | 6/2014 | Ganguly | G06Q 10/06375 706/12 |
| 2016/0078229 | A1* | 3/2016 | Gong | H04L 63/1416 726/24 |
| 2016/0182533 | A1* | 6/2016 | Purpura | H04L 63/1408 726/23 |
| 2016/0205143 | A1* | 7/2016 | Bryson | H04L 63/1433 726/1 |
| 2017/0118240 | A1* | 4/2017 | Devi Reddy | G06N 5/02 |
| 2017/0193349 | A1* | 7/2017 | Jothilingam | G06N 3/006 |
| 2017/0200087 | A1* | 7/2017 | Mascaro | G06Q 40/12 |
| 2017/0251003 | A1* | 8/2017 | Rostami-Hesarsorkh | H04L 63/1425 |
| 2018/0018590 | A1* | 1/2018 | Szeto | G16H 50/20 |
| 2018/0144003 | A1* | 5/2018 | Formoso | G06F 16/244 |
| 2018/0152471 | A1* | 5/2018 | Jakobsson | G06Q 50/01 |
| 2018/0316705 | A1 | 11/2018 | Tsironis | |
| 2019/0319978 | A1* | 10/2019 | Giffard | H04L 63/1433 |
| 2020/0195679 | A1* | 6/2020 | Du | H04L 63/1433 |

FOREIGN PATENT DOCUMENTS

| | | |
|---|---|---|
| JP | 2017183896 A | 10/2017 |
| WO | 2006076803 A1 | 7/2006 |
| WO | 2012016091 A2 | 2/2012 |
| WO | 2018213457 A1 | 11/2018 |

OTHER PUBLICATIONS

United Kingdom Search Report dated Jul. 31, 2019 for GB Application No. 1901736.7.
United Kingdom Search Report dated Jul. 31, 2019 for GB Application No. 1901738.3.
United Kingdom Search Report dated Jul. 31, 2019 for GB Application No. 1901737.5.
International Search Report and Written Opinion dated Mar. 23, 2020 for PCT Application No. PCT/GB2020/050142.
International Search Report and Written Opinion dated Apr. 1, 2020 for PCT Application No. PCT/GB2020/050140.
International Search Report and Written Opinion dated Apr. 9, 2020 for PCT Application No. PCT/GB2020/050143.

* cited by examiner

METHOD AND SYSTEM FOR PROCESSING DATA PACKAGES

CROSS-REFERENCE TO RELATED APPLICATIONS

This application claims the benefit under 35 U.S.C. § 119(a) and 37 CFR § 1.55 to United Kingdom patent application no. GB 1901736.7 filed on Feb. 7, 2019, GB 1901738.3 filed on Feb. 7, 2019, and GB 1901737.5 filed on Feb. 7, 2019. Each of the above-referenced patent applications is incorporated by reference in its entirety.

BACKGROUND OF THE INVENTION

Field of the Invention

The present disclosure relates to a method and system for processing and analysing data packages, more particularly determining a handling action for processing the data packages.

Description of the Related Technology

The transmission of data between a sending device and a receiving device on a network may require security checks in the form of verifying senders and recipients in order to determine potentially malicious or erroneously composed messages. The data may have a number of properties and/or characteristics which may aid in this determination.

Undertaking the sorts of processing that is required can be relatively time consuming and resource intensive. For example, analysing the properties and/or characteristics of the data whilst resulting in increased security and threat detection, can also result in increased frustration and annoyance on the part of the user due to the increased processing times at both the sending and receiving devices.

SUMMARY

According to a first aspect of the present disclosure there is provided a method for analysing data received by an addressed recipient of a data package, the method comprising the steps of receiving a data package over a data network, the data package comprising a header and payload data; analysing the header of the data package to determine a plurality of characteristics, the characteristics comprising at least an identifier and a transmission time; generating a risk indicator, the risk indicator indicating a risk associated with the analysis of the header; generating a handling action based on the risk indicator; and providing the payload data and the handling action to the addressed recipient. This enables the method to detect abnormal user identifiers and transmission times to detect malicious data packages, and/or detect malicious or unauthorised access of the data package, for example when a recipient has been sent a data package in error.

Methods according to the embodiments described herein analyse data packages addressed to a recipient to determine the likelihood that the data package is intended for the recipient based on an identifier and a transmission time. A risk indicator is generated and based on the risk indicator a handling action is determined. For example, the risk indicator may be used to indicate that abnormal user identifiers have been detected and/or that the data package is possibly malicious or that or the recipient is not authorised to access the data package.

The identifier may be any of a sender location, a recipient location, a sender IP address, a recipient IP address, a sender email address, a recipient email address, a sender domain, a recipient domain, and a unique package identifier. This enables the sender and/or recipient to be identified based on a number of different criteria.

The characteristics may further comprise any of, a classification of the data, device information, client information, metadata and content of the payload data. This enables other features of the data package to be considered when analysing the data package and generating the risk score.

The step of analysing the header may comprise determining a relationship between the header and at least one criterion. This enables the analysis to determine relationships between the addressed recipient and the criteria of the data package.

The at least one criterion may be a data model, and may be configured to output one or more probability values, and/or may comprise one or more probability values. This enables the criterion to be based upon different data models, or alternatively pre-calculated probability values.

The number of criteria used in the step of analysing the header may be dependent on a plurality of data points associated with the identifier, such that the number of criteria used may be based on at least one predefined relationship between the data points.

The predefined relationship may be based on any of Monte Carlo data generation algorithm, a k-means clustering algorithm, a machine learning model, an expert system, or a peak finding algorithm. This allows different types of relationships between the characteristics to be determined, and also allows non-deterministic behaviour, such that the method is able to learn and adapt to changes in the criteria.

If there are no data points associated with the identifier, data points relating to a domain associated with the identifier may be used. This enables domain level information to be used if there is no information associated with a particular user.

Generating the risk indicator may comprises obtaining additional information from at least one additional data source and may comprise processing the additional information along with the analysis of the header. This enables the method to obtain information from a variety of sources for use when updating the data models.

Generating the risk indicator may comprise at least one machine learning function, thereby enabling probability values to be determined using previously calculated machine learning functions based on information associated with the data package, previous data packages and external information.

The method may further comprise determining whether the payload data of the data package is encrypted; and may comprise decrypting the payload data based on the handling action. This enables the method to detect when data packages are encrypted and decrypt them based on the handling action.

The handling action may comprise a flag arranged to indicate at least the risk indicator to the addressed recipient. This enables the addressed recipient to be made aware of the risk indicator associated with the data package.

According to an second aspect of the present disclosure there is provided a system for analysing data received by an addressed recipient of a data package, the system comprising storage for storing a data package received via a data network, the data package comprising a header and payload data; an analysis module for analysing the header of the data package based on a plurality of characteristics, the characteristics comprising at least an identifier and a transmission time; a risk indication module for generating a risk indicator, for indicating a risk associated with the analysis of the header; an action generation module for generating a handling action based on the risk indicator; and an output module for providing the payload data and the handling action to the addressed recipient. This enables the method to detect abnormal user identifiers and transmission times to detect malicious data packages, and/or detect malicious or unauthorised access of the data package, for example when a recipient has been sent a data package in error.

Systems according to the embodiments described herein receive a data package and store it for processing. The system comprises an analysis module for determining a risk score. The risk score is based on characteristics of the data package including an identifier and transmission time. A generation module generates a risk score indicative of the likelihood that the data package is intended for the recipient. Based on the risk score a handling action is determined. For example, the risk score may be used to indicate that abnormal user identifiers have been detected and/or that the data package is possibly malicious, or the recipient is not authorised to access the data package.

The analysis module may determine a relationship between the header and at least one criterion. This enables the analysis module to determine relationships between the addressed recipient and the criteria of the data package.

The analysis module may comprise a processor, optionally, the processor may be a machine learning processor. This enables probability values to be determined using previously calculated machine learning functions based on information associated with the data package, previous data packages and external information.

The system may further comprise an encryption detection module for detecting whether the payload data of the data package is encrypted; and may comprise a decryption module for decrypting the payload data based on the handling action; wherein the output module provides the decrypted payload data and handling action to the addressed recipient. This enables the method to detect when data packages are encrypted and decrypt them based on the handling action.

The storage may be any of non-volatile memory, remote storage, and distributed storage.

According to a third aspect of the present disclosure, there is provided a non-transitory computer-readable storage medium comprising a set of computer-readable instructions stored thereon which, when executed by at least one processor cause the processor to analyse data received by an addressed recipient of a data package, the instructions comprising receiving a data package over a data network, the data package comprising a header and payload data; analysing the header of the data package to determine a plurality of characteristics, the characteristics comprising at least an identifier and a transmission time; generating a risk indicator, the risk indicator indicating a risk associated with the analysis of the header; generating a handling action based on the risk indicator; and providing the payload data and the handling action to the addressed recipient. This enables the method to detect abnormal user identifiers and transmission times to detect malicious data packages, and/or detect malicious or unauthorised access of the data package, for example when a recipient has been sent a data package in error. This enables the method to detect abnormal user identifiers and transmission times to detect malicious data packages, and/or detect malicious or unauthorised access of the data package, for example when a recipient has been sent a data package in error.

Further features and advantages of the disclosure will become apparent from the following description of preferred embodiments of the disclosure, given by way of example only, which is made with reference to the accompanying drawings.

BRIEF DESCRIPTION OF THE DRAWINGS

Throughout the Figures, like reference numerals are used to denote like features.

DETAILED DESCRIPTION OF CERTAIN INVENTIVE EMBODIMENTS

Embodiments described herein relate to methods and systems for processing and analysing data packages, by determining one or more handling actions to apply to the data package.

Data packages may be sent between senders and recipients on a data network. Due to the increased number of interconnected devices, such as smartphones, laptop computers, wearable devices and desktop computers, users are able to access data at various physical locations, provided they have a sufficient connection to the internet. Accordingly, users may be able to send and/or receive data packages from various locations, at various times, and using numerous devices. Being able to manage, track, and determine the devices that a user sends and receives data packages from, enables a system to make judgements as to the veracity of the sender and/or recipient, and as such determine whether additional measures need to be employed. For example, determining whether to increase the level of encryption, indicate to a user the risk of a potential threat, or prevent a user from opening or sending a data package.

Determining the level of processing to apply, may comprise analysing several pieces of information, such as information relating to previous interactions between the sender and recipient, and data from additional data services.

Information relating to the sender and recipient of the data package, as well as the contents of the data package may be used as the basis for determining a relationship and generating a risk score to provide an indication as to the level of processing to apply. For example, a high-risk score may result in a one or more encryption algorithms being applied to the data package prior to sending, or specific safeguards being put in place to prevent inadvertent decryption or execution of the data package at the recipient side. Alternatively, if the risk score is high enough to indicate a severe risk, it may be determined that it is undesirable to send to the recipient the package, either from the sender or in the case of the recipient enable the data package to be forwarded from the server to the recipient's device.

Determining the risk score may involve use of different functions, and in some embodiments may involve machine learning functions arranged to generate probability values for indicating a risk based on the data available for the data package, the sender, and the recipient. Being able to determine these probability values quickly and efficiently is necessary to ensure that users, be they senders or recipients, are not frustrated due to the delay of sending or receiving the data package. If they are frustrated or annoyed due to the amount of time, and lag or latency in determining the risk scores, then this may lead them to deactivate, or simply never enable the system, and as such increase the risk of a threat, be it from receiving a malicious data package or sending a data package to an incorrect recipient, for example.

Figure 1:
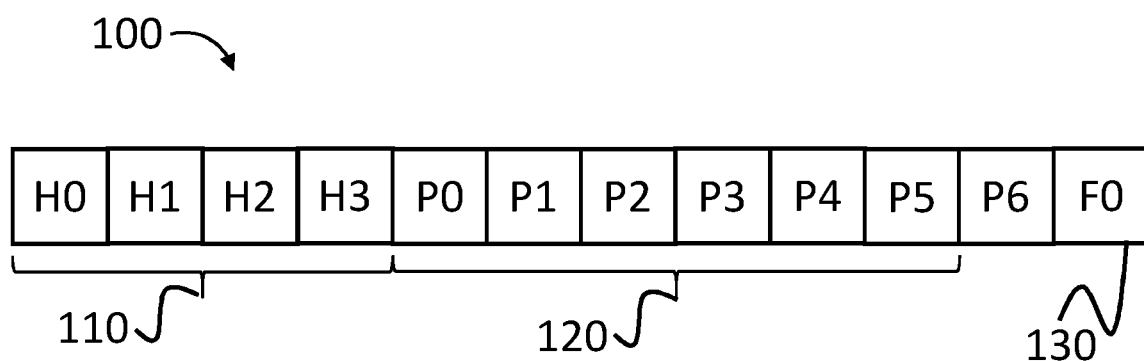
FIG. 1 is a schematic representation of an exemplary data package according to an embodiment.

FIG. 1 is a schematic representation of an exemplary data package 100 according to an embodiment. The data package 100 comprises a header 110, payload data 120, and a footer 130, and may form part of a larger data file. The data package 100 may be an email, multimedia file, programme for execution on a computing device or any other suitable data. The data package 110 may be split into a number of smaller data portions H0 . . . H3; P0 . . . P6; F0. In some embodiments, each of these portions may represent individual bits of data for example. Whilst the data package 100 of FIG. 1 comprises 11 data portions, it will be appreciated that the data package 100 may comprise a larger or smaller number of data portions.

The header 110 of the data package 100 may comprise information regarding the payload data, for example the header may include data portions relating to the length of the data package 100, synchronization data, a package number, network protocols that define what type of information is contained in the payload data, a destination address, an originating address, and a location of the sender and/or recipient. It will be appreciated that other types of data portion and any combination of those data portions may be included in the header 110.

The payload 120 of the data package 100 may comprise data associated with the content to be transmitted from the sender to the recipient. For example, the payload 120 comprises data associated with an email message or multimedia file. The payload 120 may comprise at least one data portion, which as mentioned above may be representative of individual bits of data. The data portions may also represent collections of individual bits, or even different data items. For example, the payload 120 of a data package may comprise data relating to an email, and a number of attachments to the email. As such, the payload 120 need not be representative of a single data item to be transmitted from a sender to a recipient. Similarly, the payload 120 may represent a portion of a data item. For example, where the data item to be transmitted from a sender to a recipient is a large data file, such as a multimedia file, the data package 100 may represent only a portion of that data file. In such examples, the header 110 may be used to indicate the order of the data packages 100 making up the large data file.

The data package 100 may also comprise a footer 130 for verifying the contents of the data package 100 on transmission. For example, the footer 130 may comprise a data portion F0 used for error checking, such as a cyclic redundancy check or other similar method. As with the header 110 and payload 120, whilst the footer 130 is shown as a single data portion F0, it will be appreciated that the footer 130 may comprise more than a single data portion.

Embodiments of the present disclosure will now be described with reference to:
1. a back-end architecture;
2. sender side functionality; and
3. recipient side functionality.

1. Back-End Architecture

Figure 2:
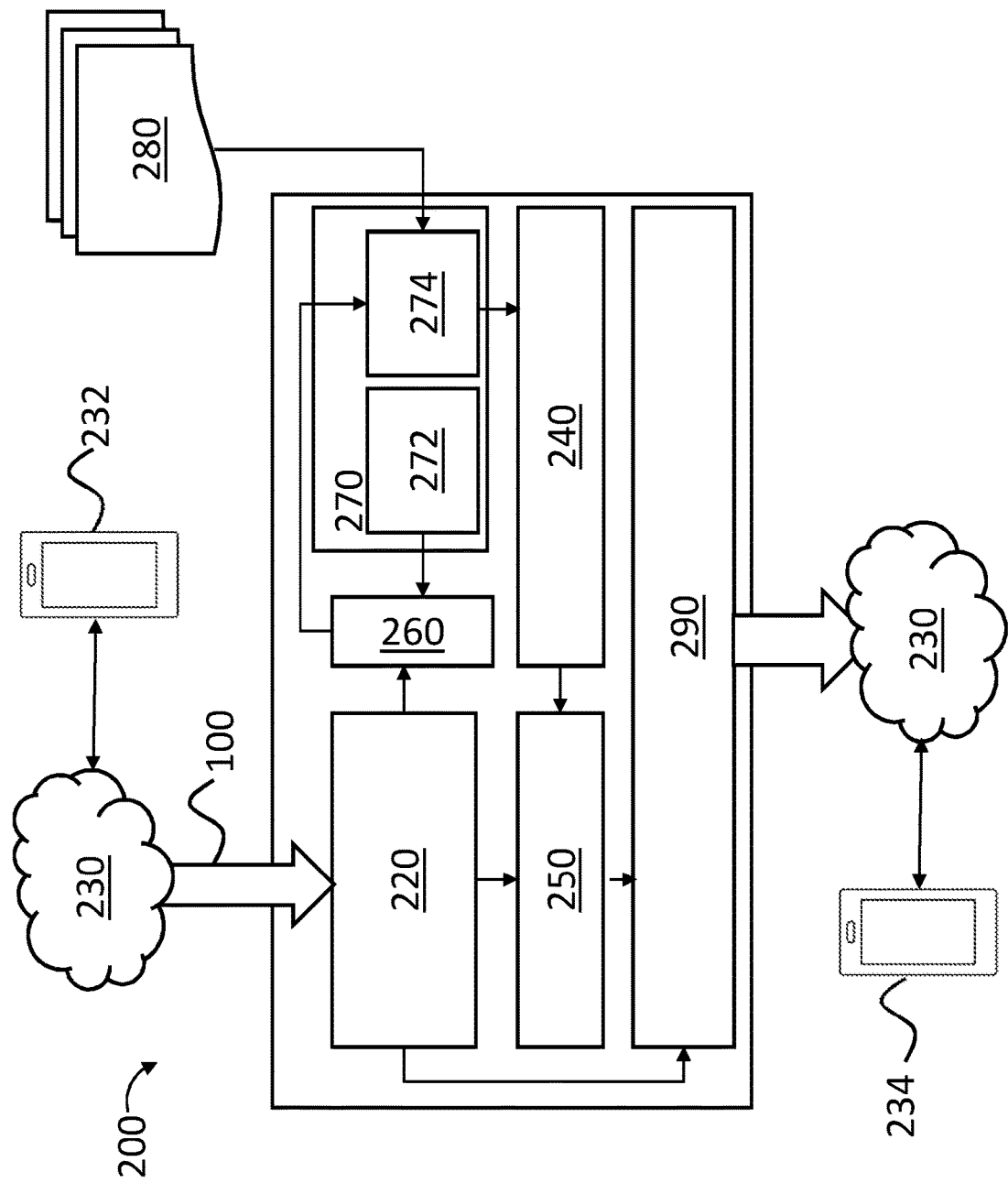
FIG. 2 is a schematic representation of an exemplary system according to an embodiment.

FIG. 2 is a schematic representation of an exemplary system 200 according to an embodiment. The system 200 receives a data package 100, such as the data package described above in relation to FIG. 1, over a data network 230. The data package 100, in some embodiments, is sent from a sender via a sender device 232, 234 as will be described below in relation to FIGS. 5-7, or in other embodiments, is received from a recipient device 232, 234, or server (not shown) associated with a recipient device 232, 234 as described below in relation to FIGS. 9-11.

Each of the sender and recipient devices 232, 234 may be connected to the data network 230, so as to be communicably coupled to one another. The data network may be any type of computer network, such as the Internet, and the sender and recipient devices 232, 234 may be connected to the data network by a wired or wireless link.

The system 200 comprises an input module 220 for receiving the data package 100 over a data network 230. The input module 220 receives the data package 100, for example when a sender wishes to transmit the data package 100 from their sending device represented as 232, to a recipient device represented as 234 in this example.

The system 200 also comprises storage 240 for storing one or more criterion associated with the functioning of the system 200. For example, the storage 240 may comprise data associated with previous interactions between users, such as the internet protocol (IP) addresses of users—both senders and recipients—or, where the system 200 does not comprise data associated with a particular recipient, data relating to other users on the same domain, common recipients for a particular sender's data packages, the locations that the sender usually sends data packages from, device information, software version, client information e.g. browser type, and content metadata—such as order of keystrokes and the speed of keystrokes. For a given data model, the storage 240 may comprise parameters associated with a particular machine learning model, metadata relating to the recalculation of the model, and data such as statistics which may be used to diagnose potential errors. The criteria stored in the storage 240 may also include pre-calculated models associated with particular actions. For example, the pre-calculated models may include probability values associated with particular actions. In some examples the probability values may be predetermined based on one or more characteristics of the system 200. That is, for each sending event from a first user to a second user, there may be a probability value or a pre-calculated model stored in the storage 240 for determining the likelihood of such a sending event. The probability values may be dependent on particular characteristics of the data package to be sent, for example, based on information stored within the header 110 of the data package 100, and may also be dependent upon characteristics of the sender and recipient device 232, 234. There may be a data model for generating one or more probability values based on a user sending a data package 100 to a particular recipient at a particular time and from a particular device. The data models may be generated using a Gaussian model or Monte Carlo simulation. However, it will be appreciated that any number of other data models may be stored in storage 240, and associated with generating probability values for particular combinations of user and environmental characteristics. In other examples, probability values may be stored directly, when the probability values are associated with common actions undertaken by users. This increases the efficiency of the system for these common actions, as there is no need to undertake the additional processing to calculate the probability values associated with particular data models.

The storage 240 may be a random-access memory (RAM) such as DDR-SDRAM (double data rate synchronous dynamic random-access memory). In other examples, the storage 240 may be or include a non-volatile memory such as Read Only Memory (ROM) or a solid-state drive (SSD) such as Flash memory. The storage 240 in examples may include further storage devices, for example magnetic, optical or tape media, compact disc (CD), digital versatile disc (DVD) or other data storage media. The storage 240 may be removable or non-removable from the system 200. In some embodiments, the storage 240 may be external to the system 200. That is that the storage 240 may be remote, such as cloud storage.

The system 200 also comprises a decision-making module 250 for processing the data package 100. The decision-making module 250 analyses the data models or probability values stored in the storage 240, along with the data package 100 to determine a risk score. The risk score is indicative of a handling action to apply to the data package 100. The decision-making module 250 will be described in more detail below with reference to FIG. 3.

The risk score generated by the decision-making module 250 is used to determine a handling action to apply to the data package 100 at the processing module 290. The processing module 290 uses the risk score as an indicator for determining a handling action to apply to the data package 100. There are a number of different handling actions which may be applied to the data package 100. The handling actions may require additional hardware components to process the data package 100, or alternatively may be applied solely using software, or a combination of the two. For example, where a risk score produced by the decision-making module 250 indicates that the sender does not often send data packages to a particular recipient and that the payload data 120 contains confidential information, such as an email message with the subject 'Confidential', then the risk score may be sufficiently high to indicate that the data package 100 should be encrypted. In such an example, the processing module 290 may comprise an encryption unit (not shown) for encrypting the payload 120 of the data package 100. The encryption module may apply a level of encryption to the payload 120 according to the risk score. Where the risk score indicates that there is a high risk of a threat, such as when sending to a new recipient or sending confidential information, for example, then a higher level of encryption may be applied to the payload 120. Conversely, where non-confidential information or where the recipient is known due to a number of previous interactions, the level of encryption applied to the payload 120 may be lower, or in some examples, the payload 120 may not be encrypted at all.

Once the processing module 290 has applied the relevant handling action to the data package 100, it is transmitted to the recipient device 232, 234 via the data network.

When the data package 100 is received by the recipient device 232, 234, corresponding actions are undertaken, whereby similar checks are performed to determine a risk of accepting the data package 100, for example determining whether to decrypt the data package 100. This will be described in further detail in relation to FIG. 9-11 below.

Upon receipt of the data package 100, the system 200 temporarily stores the data package 100 in a buffer 260. The buffer 260 may be or include volatile memory such as Random Access Memory (RAM) or non-volatile memory for example a solid-state drive (SSD) such as Flash memory. The buffer 260 in examples may include further storage devices, for example magnetic, optical or tape media, compact disc (CD), digital versatile disc (DVD) or other data storage media. The buffer 260 may be removable or non-removable from the system 200.

The data package 100 is stored in the buffer 260. This enables the data package 100 to be insulated from any changes as a result of the recalculation of the data models. For example, the buffer 260 may enable the updating of the data models to be paused, such that the most up-to-date models are used to determine a risk score quickly and efficiently, and then when necessary, the data package 100 in the buffer 260 may be used to update the data models. The updated data models are then used in other instances, such as on receipt of subsequent data packages 100. This enables separation between the decision-making portion comprising the decision-making module 250 and the processing module 290, and the updating portion comprising the updating module 270 as will now be described.

The updating module 270 may comprise a monitoring unit 272 for determining when a data package 100 has been placed in the buffer 260. This may be achieved by using a serverless scalable complex event processing engine, such as an Azure stream analytics system thereby allowing the system 200 to be easily scalable, however, it will be appreciated that a number of other types of system may be used for monitoring the buffer 260 and reading data from it. The updating module 270 also comprises at least one recalculation unit 274, which generates an updated data model. The recalculation units 274 update the data models in the storage 240.

The monitoring unit 272 may also be used to temporarily stall the updating of the data models. For example, for any given sender and/or recipient it may be desirable not to update the models upon receipt of every data package 100 so as to more efficiently manage system resources such as memory, power consumption and processing time. In such embodiments, the monitoring unit 272 may be tuned based on the amount of information the system 200 holds for a particular sender and/or recipient. For example, where there is little information about a particular sender/recipient, it may be beneficial to update the data models more frequently, as each time a data package 100 is received, this will have a greater impact on the recalculation of the data models. Conversely, where there is a large amount of data about a particular user, the models may be updated less frequently. As such, the monitoring unit 272 may be configurable to indicate to the recalculation units 274 when to update the data models based on the amount of information already stored about particular recipients and/or senders.

The updating module 270 may comprise a plurality of recalculation units 274, wherein each recalculation unit 274 is associated with at least one of the data models in storage 240. In some examples, the monitoring unit 272 may determine when it is appropriate to update the data models, for example, if the data models are being used by the risk determination unit 250 to determine a risk associated with a data package 100, then the monitoring unit 272 may indicate that it is not an appropriate time to recalculate the data models based on the received data package 100. As such, the received data package 100 is insulated from any amendments made to the data models after being received. Each recalculation unit 274 may comprise a plurality of functions, some of which may be machine learning functions, for updating or generating new data models for use in determining probability values associated with a particular action as described above. The functions may use data contained in the data package's 100 header 110, payload 120, and/or footer 130. This data may be combined with data from one or more additional data services 280 such as a third-party data source, or other internal database, for example business usage information. The data from the additional data services 280 may influence the output of the data model when determining probability values. The data from the additional data services 280 may include an external source of data capable of providing additional data points in relation to a particular action. For example, one additional data service 280 may contain data associating IP addresses with a physical, real-world location. Other additional data services 280 may provide additional information relating to domain names, such as the age of the domain, who owns the domain, and associated domains, for example, TLS, SPF, and DMark services. In yet further examples, opinions on domains may be obtained from additional data services 280 and used to update the data models, such as the service provided by Clearbit™, which extracts data from websites and mail systems associated with a domain. Other additional data services 280 may be used depending on the properties the data models are designed to update. The information provided by the additional data services 280 can, therefore, be combined with the data package 100 to determine relationships between particular features or characteristics of the data package.

As mentioned previously, the buffer 260 acts as a means of temporarily storing the data package 100, this, insulates the data package 100 from any changes to the data models which occur following receipt. In some examples, temporarily storing the data package 100 in the buffer 260, enables the risk score to be determined using the most up-to-date data models at the time or receipt, therefore providing the risk score to the user without delay. The data models may then by updated at a later stage by incorporating information associated with the data package 100. The updated data model may then be used when generating risk scores for subsequently received data packages 100. This has the benefits of reducing the delay in generating a risk score, as there is no need to wait for the updating module 270 to finish updating the data models. This preserves the user experience, and more efficiently and accurately provides risk scores for use in determining the handling action to apply to the data package 100.

Figure 3:
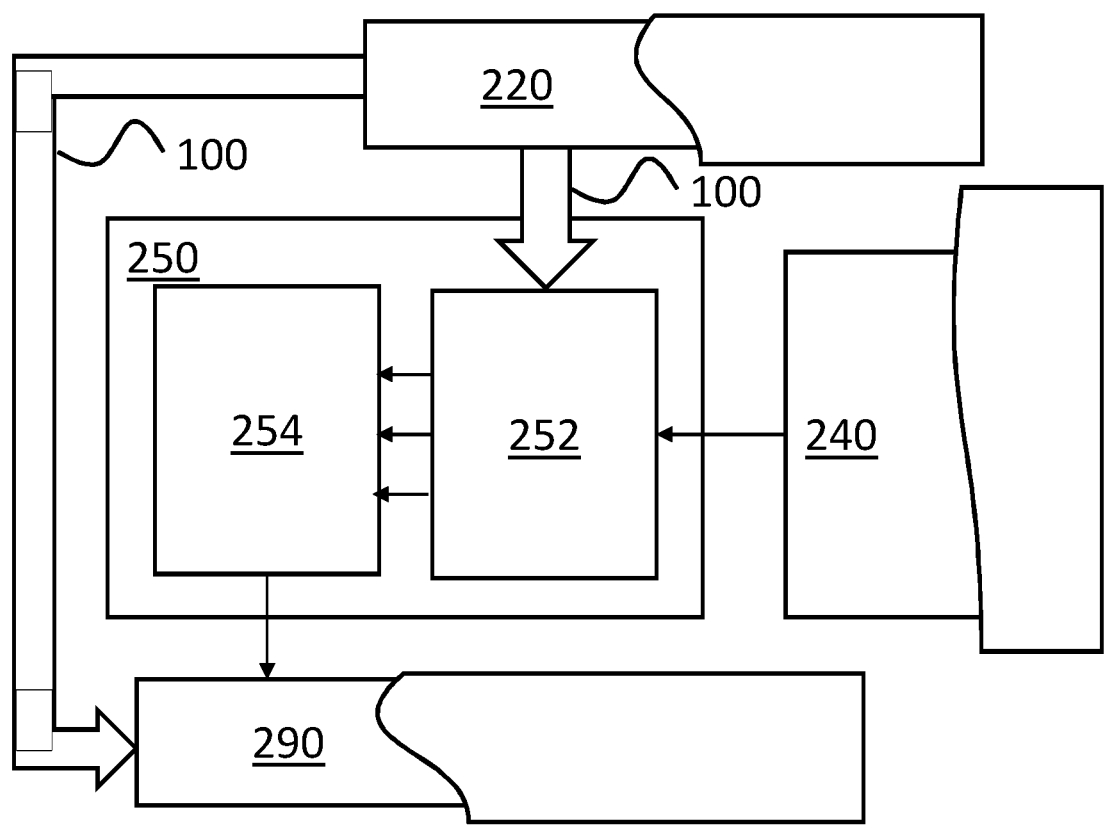
FIG. 3 is a schematic representation of a decision-making module according to an embodiment.

FIG. 3 shows a schematic diagram of a decision-making module 250 according to an embodiment. As mentioned above, the decision-making module 250 is arranged to analyse the data models or probability values stored in the storage 240, along with the data package 100 to determine a risk score.

The decision-making module 250 comprises at least one attribute checker 252 and a combination unit 254. Each attribute checker 252 may be associated with a data model or probability value stored in storage 240. The attribute checker 252 may use machine learning functions to determine one or more probability values associated with particular characteristics of the data package 100, the probability values may be based on the data models and/or probability values in storage. As such, the attribute checkers 252 and/or the decision-making module 250 may comprise at least one machine learning processor.

For example, each attribute checker 252 may output two probability values:
the probability of observing data D, given a particular hypothesis H is true; and
the probability of observing data D, given that Hypotheses H is not true.

In one example, the data package 100 may be sent from sender A to recipient B. The sender and recipient information may be contained within the header 110 of the data package 100, such that a first attribute checker 252 may use this information in combination with a data model from storage 240, wherein the data model is arranged to determine the likelihood of sender A sending a data package 100 to recipient B, or to any recipient (not necessarily any specific recipient such as recipient B in this example) on a given domain. Additionally, a second attribute checker 252 may use information associated with the transmission time of the data package 100 in combination with a data model from storage 240, to determine the likelihood of sender A sending a data package at the transmission time. Each of the first and second attribute checkers may each determine a probability value associated with the properties of the data package based on the data models. Furthermore, as the data models are regularly updated, as discussed above in relation to FIG. 2, the attribute checkers 252 determine probability values based on a variety of up-to-date factors, such as previous interactions between the sender and the recipient.

Once the attribute checkers 252 have determined the individual risks associated with particular characteristics of the data package 100, they may be combined in a combination unit 254. The combination unit 254 takes each of the individual probability values calculated by the attribute checkers 252 and combines them to produce an overall probability value indicative of a risk score associated with the data package 100 based on its properties.

Upon receiving a probability value from each of the attribute checkers 252, the combination unit 254 combines the received probability values to form an overall probability that the hypothesis H is true given the data package 100. This may be achieved using Bayes rule. For example, if a first attribute checker 252 provided a probability value, and a second probability value the overall probability—a hypothesis is true given particular data—may be based on a Bayesian inference.

In some embodiments, the attribute checkers 252 may be an HTTP service which may operate as a serverless function and respond directly to requests made by the system 200. For example, the system may request a particular attribute checker 252 for determining whether an IP address is consistent with previous requests for a particular sender. If such an attribute checker 252 does not exist the HTTP service may return a 404 status code, else the HTTP service may return a 200 status code. This enables the combination unit 254 to efficiently determine which attribute checkers 252 to use when generating the combined probability value and therefore determining a risk score.

The data package 100 may have properties for which an attribute checker 252 does not exist, or is not able to generate a probability value. For example, where a data package is sent from a sender to a new recipient (one whom the sender has not previously sent a message), an attribute checker 252 may not exist or may not be able to generate an accurate probability value. As such, the decision-making module 250 may use other information contained within the data package 100. For example, where there is no information regarding interactions with between a particular sender and recipient, and as such no accurate probability value is able to be generated, the decision-making module 250 may look to other information, such as previous interactions between any sender and any recipient having the same domain characteristics. Based on this information a probability value may be generated for such a relationship and combined with the probability values of other attribute checkers 252. In some embodiments, where such a probability value is generated, this may be given lesser weight in the generation of the combined probability value. In other examples, where there is no attribute checker 252 capable of generating a probability value for a particular characteristic of the data package 100 a predetermined or default probability value may be used. This default probability value may be dependent upon settings of the sender and/or recipient of the data package 100 and is capable of being updated by the updating module 270.

In addition to determining whether an attribute checker 252 is able to generate a probability value for a particular property of the data package 100, the decision-making module may also validate the information used to generate the probability values. For example, the attribute checkers 252 may validate the data models used, by looking at various properties, such as when the data model was last updated. If it is determined that the data model was last updated before a predetermined date and/or time, a flag may be set to indicate that the data models require updating, thereby indicating to the updating module 270, in particular the monitoring unit 272 of the updating module 270, to update the data models at the next available opportunity, as discussed above in relation to FIG. 2. In some examples, it may be desirable to inform user (either the sender or the recipient), that the information used to determine the risk score may be out of data, in such an example, the decision-making module 250 may notify the user, for example by providing a warning on the user's device 232, 234. The warning may be an indication that, such as a pop-up or audible warning.

In some embodiments, the decision-making module 250 may determine which attribute checkers 252 to use. This may be based on the amount of information the system 200 has associated with the properties of the data package 100. For example, where there is a large amount of information for a particular data package, a simple model for generating the combined probability value may be used, and where more information is used more complex model for generating the combined probability value may be used, wherein the more complex the model, the more individual probability values are combined to create the combined probability value. In yet further embodiments, determining which attribute checker 252 probability values, and in some cases the number of probability values, to use may comprise using dynamically calculated ranges. For example, a Gaussian model, or Monte Carlo simulation may be used to determine at which point to move to a more complex model for combining the individual probability values. Alternatively, a clustering algorithm may be used to cluster the information and determine at which point to move to a more complex level based on an inter-cluster distance. The clustering algorithm may be a k-means clustering algorithm or a peak-finding method. The peak finding method may calculate a density histogram with various bin widths; an average number of peaks in the density histogram may then be rounded to the nearest whole number and used as the number of clusters for determining the complexity level, and as such the probability values to use when determining the combined probability value. The complexity level may be determined by generating a silhouetting metric based on the inter-cluster distance, such that the larger the inter-cluster distance the more defined the clusters are. For each of the different levels of complexity, the clustering algorithm may be used to determine clusters of the information and determine which level of complexity provides the highest silhouetting metric, and hence the most defined clusters.

As described above in relation to FIG. 2, an overall risk score is then passed to the processing module 290 to process the data package 100. The processing module 290 applies a handling action to the data package 100, wherein the handling action is based on the overall risk score generated by the combination unit 254. The handling action may include encrypting a data package 100 to be sent to a recipient or decrypting a received encrypted data package 100.

Figure 4:
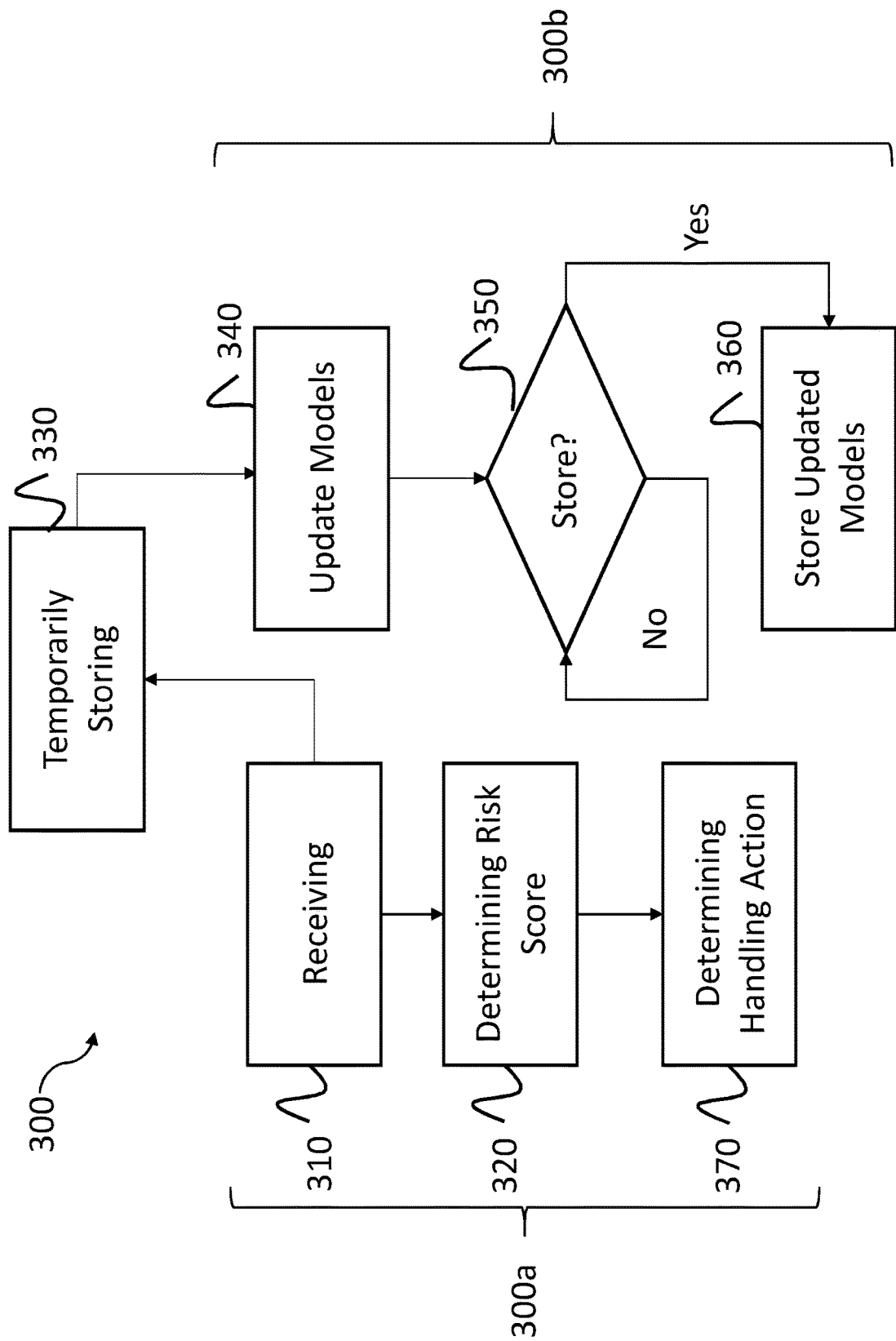
FIG. 4 is a flowchart showing a method for determining a risk score associated with a data package, applying a handling action to the data package, and updating data models according to an embodiment.

FIG. 4 is a flowchart showing a method 300 for determining a risk score associated with a data package, applying a handling actions to a data package, and updating data models according to an embodiment.

The method 300 comprises two portions: a decision-making portion 300a, and an updating portion 300b.

The decision-making portion 300a comprises steps for determining a risk score associated with a data package. At step 310, a data package, such as data package 100 described above in relation to FIG. 1, is received by a system, such as system 200 described above in relation to FIG. 2. Upon receipt of the data package, a portion of the data package is temporarily stored at step 330, for example, the header data 110. The portion stored temporarily comprises the information necessary for the updating portion 270 of a system 200 to update the data models, such as a user identifier and/or IP address of whichever device has been used to send the data package 100. Concurrently, the data package, at step 320 is used to determine a risk score associated with one or more properties of the data package. For example, the risk score may be determined using one or more data models associated with particular characteristics of a data package, such as previous interactions between the sender and recipient(s), identifiers associated with the sender and recipient(s), the time the data package was sent or any other relevant characteristic or property of the data package.

The risk score determined at step 320 is based on one or more probability values generated by the data models, as described above in relation to FIG. 3. Where there is a plurality of probability values generated for different relationships, they may be combined to produce an overall probability value indicative of a risk score. Based on the risk score, at step 370, a handling action is determined and applied to the data package. For example, if the risk score indicates that there is likely to be a threat, such as sending to a recipient for the first time, or sending confidential information, then the handling action may be an encryption routine for encrypting the data package prior to sending. Similarly, on receipt of a data package, the risk score may be high indicating that the received data package is from an unknown recipient, or from a recipient whose domain was recently activated, as such the handling action may comprise presenting a warning to the recipient about a potential threat.

As mentioned above, upon receipt of the data package at step 310, the data package, or a portion of the data package is temporarily stored at step 330 such as in the buffer 260 described above in relation to FIG. 3. The step of temporarily storing the data package forms part of the updating portion 300b of method 300. Temporarily storing the data package in the buffer enables the decision-making portion 300a and the updating portion 300b to operate separately such that the portions 300b, 300b are performed asynchronously. Enabling the decision-making portion 300a and the updating portion 300b to be performed asynchronously ensures that the risk scores produced by the decision-making portion 300a at step 320, and as such the determination of the handling action at step 370 are not adversely affected by one or more of the data models being updated by the updating portion 300b.

At step 340, the data models are updated based on data from additional data services and the data package or portion of the data package, as described above in relation to the updating module described in FIGS. 2 and 3. The method then progresses to step 350.

At step 350 of the updating portion 300b, the method 300 checks whether to store one or more of the data models. Determining whether to store one or more data models may comprise determining whether a data package is stored in the temporary storage, or may be based on when the data models were previously updated. Step 350 may also perform a number of other checks, as mentioned above, such as determining whether it is necessary to update the data models based on how much information is available regarding a particular data model. For example, where there is a large amount of information to process for a particular data model it may not be efficient to update the data model every time a new data package is received. It will be appreciated that there may be other reasons that it may be deemed necessary to update the data models.

As such, the method 300 waits at step 350 until it is determined that it is necessary to update the data models. As mentioned above, this may be as the result of the receipt of a data package 100, or may be as a result of determining that a data package has not been updated for a predetermined amount of time. Once the method 300 has determined that it is necessary to update the data models, the method 300 progresses to step 360, where the updated models are stored, for example in the storage 240 of system 200 described above. This ensures that the determination of risk scores at step 320 is not delayed due to waiting for the data models to be updated, whilst ensuring that the models may be updated for subsequently received data packages.

The data models may also be updated based on data from additional data services and the data package, as described above in relation to the updating module described in relation to FIGS. 2 and 3.

2. Sender Side

Figure 5:
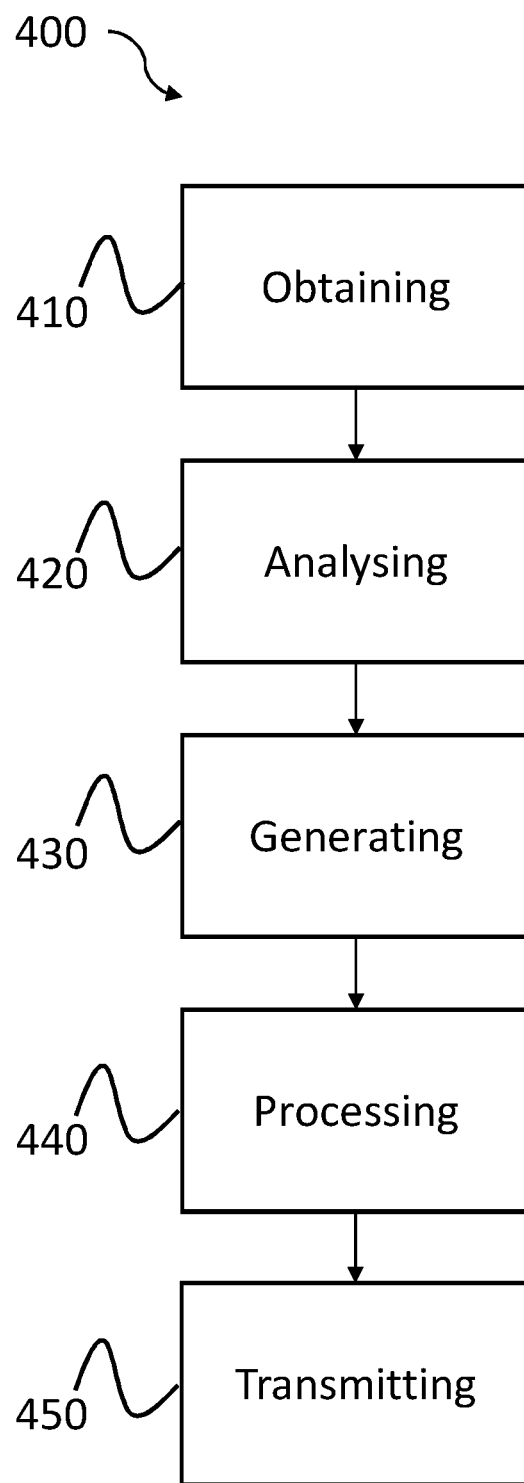
FIG. 5 is a flowchart showing a method for processing a data package to be sent to an addressed recipient according to an embodiment.

FIG. 5 is a flowchart showing a method 400 for processing a data package, such as the data package 100 of FIG. 1, to be sent to an addressed recipient according to an embodiment.

At step 410, the method 400 obtains the data package to be sent to an addressed recipient. The data package may be obtained from a sender device, or from a service associated with the sender, such as an email client or cloud storage service.

Once obtained, the method 400 progresses to step 420, where the data package is analysed. In some embodiments, the entirety of the data package, including the payload data may be analysed, however, in other embodiments, only the header of the data package may be analysed. At step 420, the method 400 analyses at least the header of the data package to determine a plurality of characteristics associated with the data package. For example, the header will contain at least information relating to the addressed recipient, including a recipient identifier. The recipient identifier may be any unique data for identifying the recipient, for example, an email address, an IP address, device MAC address, unique package identifier, or any other suitable identifying characteristic. The plurality of characteristics may also include information relating to the sender, such as a sender identifier, information relation to the content of the payload data, and a classification of the data. It will be appreciated that other characteristics may also be used when analysing the data package, which will be apparent to the skilled person.

Analysing the data package includes determining one or more relationships between properties associated with the data package. The analysis may involve using one or more data models to determine a probability value based on the relationship between the plurality of characteristics of the data package. For example, the analysing the data package may comprise comparing a recipient identifier and a transmission time. A data model may use previous interactions between the sender and the recipient to determine the likelihood of a sender sending a data package to the recipient at the transmission time. The data models used by the analysis may be machine learning models, stored remotely to the sender's device capable of providing one or more probability values.

Once the data package has been analysed the method 400 progresses to step 430 where a risk indicator is generated. The risk indicator is based on the analysis undertaken at step 420, and the probability values generated. The risk indicator is indicative of a risk associated with the analysis of the data package. The analysis may be based on a plurality of data points associated with the recipient and a relationship between the data points. For example, where a sender is sending a data package to a recipient, and there is no previous interaction between the two, the result of the analysis at step 420 may be that sending the package is high risk. In another example, the system may have information relating to previous interactions between the sender and recipient, however these interactions may have occurred at different times, which do not correlate with the transmission time. In such a case, a data model may be used to determine what the likelihood is of a sender sending a data package to a recipient, at a particular time. If a recipient was to very rarely work from home, for example, it would be unlikely that a sender would send a data package during working hours to an IP address of the recipient, where the IP address is the recipient's home IP address. In such a case the data models may indicate that sending a data package based on these characteristics may also be high risk. Alternatively, if the sender was to send the data package to the recipient at an office IP address during office hours, then the risk score generated may be lower as this would be expected behaviour.

Where there are no data points associated with a particular recipient, or recipient identifier, more general data points, such as data points associated with the recipient's domain may be used.

Determining what and how many data models to use when analysing the data package, may be based on the amount of information available for the system to analyse. Where there is not much information regarding a particular interaction or type of data package, for example, a simple model may be used. Conversely, where there is a large amount of information a more complex model may be employed. To determine at which point to move from a simpler to more complex model, a clustering algorithm may be used to cluster the information and determine at which point to move to a more complex level based on an inter-cluster distance. The clustering algorithm may be a k-means clustering algorithm or a peak-finding method. The peak finding method may calculate a density histogram with various bin widths, an average number of peaks in the density histogram may be rounded to the nearest whole number and used as the number of clusters for determining the complexity level, and as such the probability values to use when determining the combined probability value. The complexity level may be determined by generating a silhouetting metric based on the inter-cluster distance, such that the larger the inter-cluster distance the more defined the clusters are. For each of the different levels of complexity, the clustering algorithm may be used to determine clusters of the information and determine which level of complexity provides the highest silhouetting metric, and hence the most defined clusters. Based on these clusters, groups of data models may be used to generate the risk score.

Once the risk score has been generated, the method progresses to step 440, where the data package obtained at step 410 is processed. The risk score generated at step 430 is used to determine a handling action to apply to the data package. There may be any number of handling actions including handling actions for encrypting the data package, notifying the sender, or any other processing action as will be appropriate to the skilled person. Once the handling action is determined it is applied to the data package to produce a processed data package, and the method progresses to step 450 where the processed data package is transmitted to the addressed recipient.

In some embodiments, the handling action may be an encryption action, such that at step 440, the payload data of the data package is encrypted. The level of encryption, or even whether encryption is applied to the payload data at all may be dependent on the risk indicator. It will be appreciated that other handling actions may also be applied to the data package.

The method 400 may be undertaken on the sender's device, or alternatively it may be undertaken on a remote device, such as the system 200 described above in relation to FIGS. 2 and 3, whereby determining the risk indicator and a handling action to apply may be undertaken by the decision-making module 250, of system 200, and applying the handling action may be undertaken by the processing module 290 of system 200. In certain embodiments, some functionality may be undertaken on a remote device, such as system 200, and some functionality may be undertaken on the sender's device. For example, the analysis at step 420, and/or generation/updating of data models at step 430 may be undertaken on a remote device, whereas the generation of the risk score for a given data package 100 based on the probability values from step 420, and the processing of the data package at step 440, may be undertaken on the sender's device, based on parameters such as the mentioned probability values generated by the data models. These would be provided to the sender's device from the remote device. Data packages 100 may then be provided to the remote device for use in updating the data models at a later time.

Figure 6:
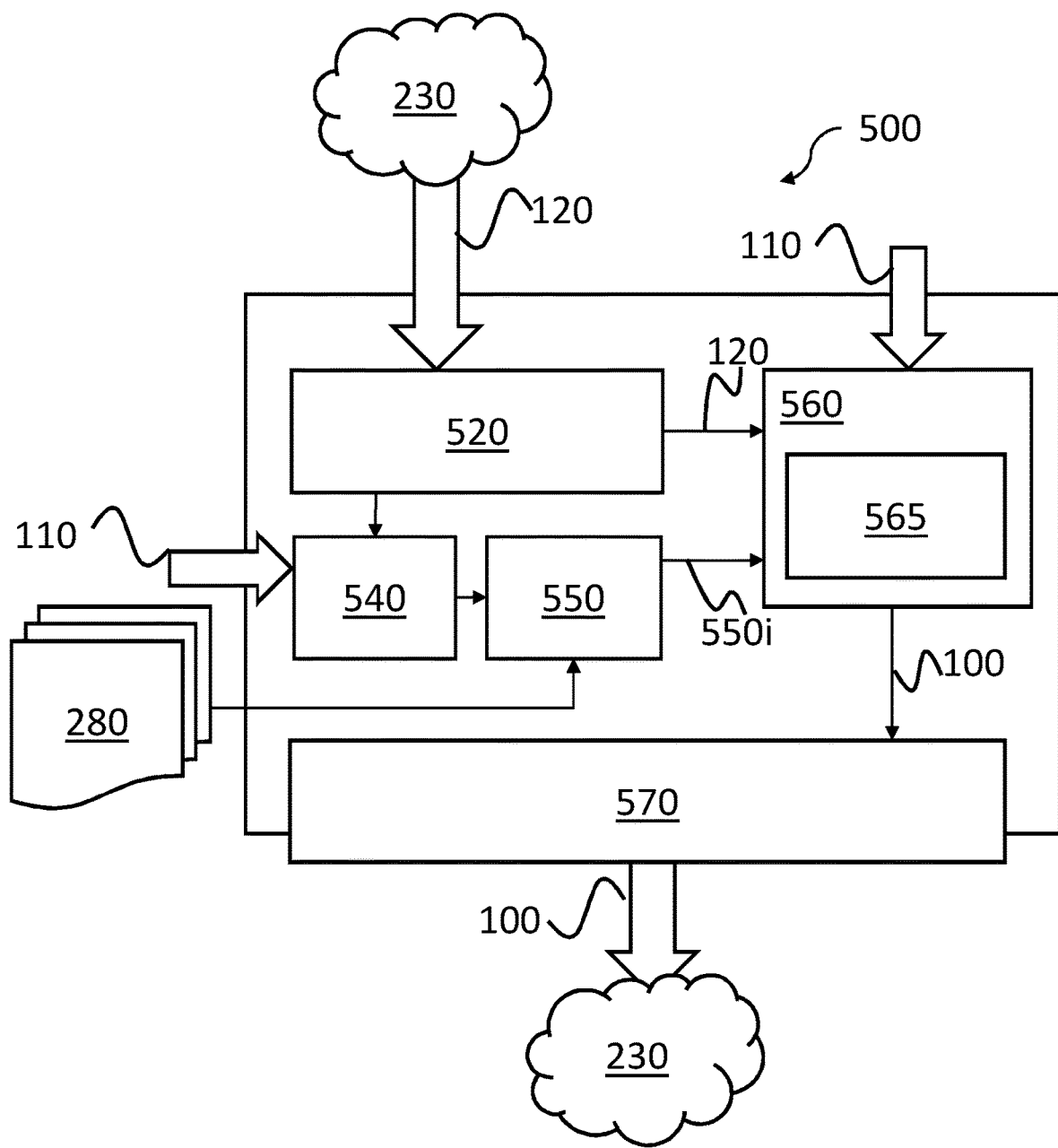
FIG. 6 is a schematic representation of a system for processing a data package to be sent to an addressed recipient according to an embodiment.
Figure 7:
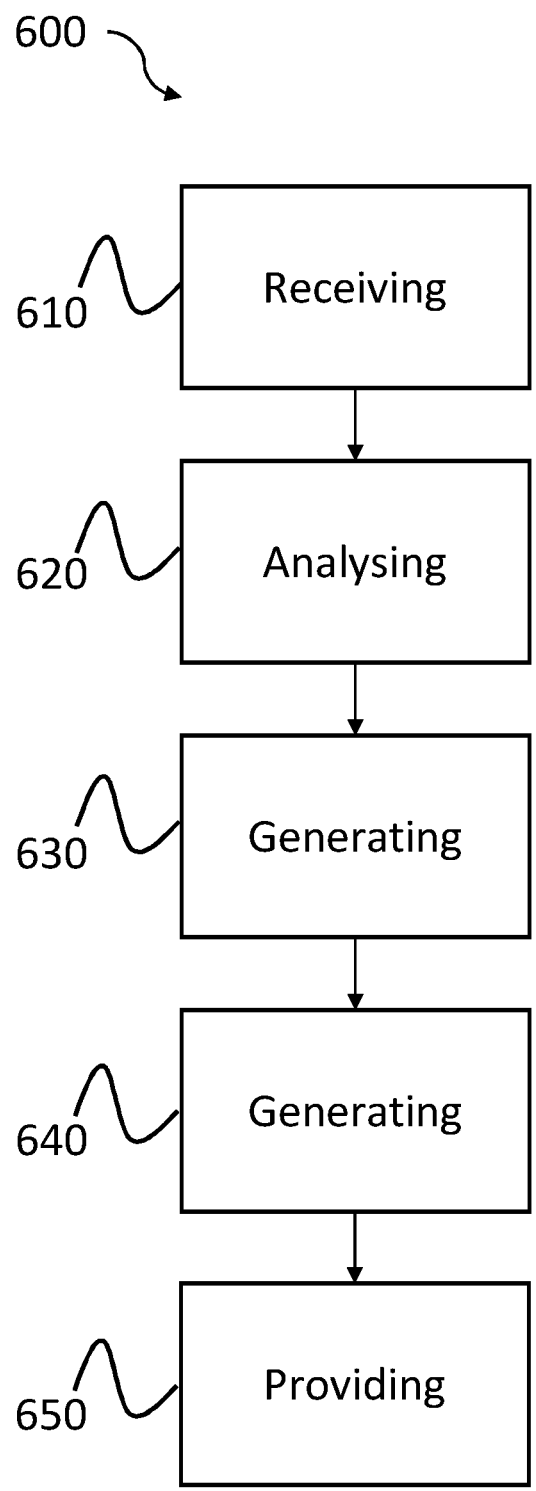
FIG. 7 is a flowchart showing a method for analysing data received by an addressed recipient according to an embodiment.

FIG. 6 is a schematic representation of a system 500 for processing a data package 100 to be sent to an addressed recipient according to an embodiment. The system 500 may form part of a sender's device, and generate a processed data package 100 for sending to the addressed recipient based on payload data 120 and header data 110. In some examples, as mentioned above in relation to method 400, some aspects of system 500 may form part of a remote device, such as the system 200 described above in relation to FIGS. 2 and 3.

The system 500 comprises storage 520 for storing payload data 120 to be sent via a data network 230 as a data package 100. The storage 520 may be a random-access memory (RAM) such as DDR-SDRAM (double data rate synchronous dynamic random-access memory). In other examples, the storage 520 may be or include a non-volatile memory such as Read Only Memory (ROM) or a solid-state drive (SSD) such as Flash memory. The storage 520 in examples may include further storage devices, for example magnetic, optical or tape media, compact disc (CD), digital versatile disc (DVD) or other data storage media. The storage 520 may be removable or non-removable from the system 200. In some embodiments, the storage 520 may be external to the system 500. That is that the storage 520 may be remote, such as cloud storage.

Upon receipt of the payload data 120, the payload data is provided to a processing module 560, along with header data 110. The system 500 also comprises an analysis module for analysing the header data 110 and the payload data 120.

The analysis module 540 analyses the header data 110, and in some examples the payload data 120, to determine one or more probability values. The probability values may be determined based on one or more data models as described above in relation to step 420 of method 400. The data models may have been generated based on previous interactions between senders and recipients, and/or other data points and relationships between them. In particular, the analysis module 540 uses the data models to determine a relationship between the recipient and the transmission time of the data package 100, and a probability that the sender would send the data package 100 to the recipient at the transmission time. The data models used may be stored remotely from the system 500 and may be updated according to the method 300 and system 200 described above in relation to FIGS. 2 and 4.

The system 500 also comprises a risk indication module 550 for generating a risk indicator 550i based on the probability values generated by the analysis module 540. The risk indication module 550 may generate the risk indicator 550i based on one or more of the probability values provided by the analysis module 540.

In some embodiments, the risk indication module 550 may obtain additional information for determining a risk indicator 550i from one or more additional data services 280. The additional information may be used in combination with the information associated with the header data 110 to determine which probability values should be considered when determining the risk indicator 550i, and also for generating additional probability values for consideration. For example, an external database holding information relating to domain names may be used by a data model to help establish a trustworthiness score for a particular domain. This may then be incorporated into the calculation determining the risk indicator 550i.

Both the analysis module 540 and the risk indication module 550, may form part of a remote system, for example, they may form part of the decision-making module 250 of the system 200 described above in relation to FIG. 2. As such, the analysis module 540 and risk indication module 550 may comprise any of the features described above in relation to the decision-making module 250 of FIG. 2.

Once the risk indication module 550 has generated a risk indicator 550i, this is provided to the processing module 560 along with the payload data 120 and the header data 110 to process the data package 100. The processing module 560 determines a handing action to apply to the data package 100 based on the risk indicator 550i and applies the handling action to the data package 100. As mentioned above in relation to step 440 of method 400, the handling action is dependent on the risk indicator 550i. For example, if the risk indicator 550*i* indicates that sending the data package 100 is high risk, then the handling action may require the sender to confirm that the data package 100 is to be transmitted to the recipient. Conversely, if the risk indicator 550*i* indicates that sending the data package 100 is low risk, then the handling action may require no sender input, and the data package transmitted unmodified.

In some embodiments, the processing module 560 may also comprise an encryption unit 565 for encrypting the data package 100 prior to transmission to the addressed recipient. The encryption unit 565 encrypts data packages 100 based on the risk indicator 550*i*. For example, where the risk indicator 550*i* indicates that sending the package to a recipient at a transmission time is high risk, the encryption unit 565 encrypts the data package 100 prior to transmission. If the risk indicator 550*i* indicates that the risk is lower, then a lower level of encryption may be applied by the encryption unit 565, or no encryption applied at all.

The system 500 also comprises a transmission module 570 for transmitting the data package 100, after any necessary processing, to the addressed recipient via the data network 230.

3. Recipient Side

FIG. 8 is a flowchart showing a method 600 for analysing data received by an addressed recipient according to an embodiment.

At step 610, the method 600 receives a data package 100 from a sender, addressed to a recipient. The data package 100 may be a data package 100 as described above in relation to FIG. 1. Upon receipt of the data package 100, the method progresses to step 620, where the header 110 of the data package 100 is analysed.

In some embodiments, the entirety of the data package 100, including the payload data 120 may be analysed, however in other embodiments, only the header 110 of the data package may be analysed. At step 620, the method 600 analyses at least the header 110 of the data package 100 to determine a plurality of characteristics associated with the data package 100. For example, the header 110 will contain at least information relating to the sender, including a sender identifier. The sender identifier may be any unique data for identifying the sender, for example, an email address, an IP address, device MAC address or any other suitable identifying characteristic. The plurality of characteristics may also include information relating to the recipient, such as a recipient identifier, information relation to the content of the payload data, and a classification of the data. It will be appreciated that other characteristics may also be used when analysing the data package 100, which will be apparent to the skilled person.

Analysing the data package includes determining one or more relationships between properties associated with the data package. The analysis may involve using one or more data models to determine a probability value based on the relationship between the plurality of characteristics of the data package. For example, the analysing the data package may comprise comparing a sender identifier and a transmission time. A data model may use previous interactions between the sender and the recipient to determine the likelihood of the sender sending a data package to the recipient at the transmission time. Analysing the data package may also include determining one or more features of the payload data. For example, where the payload data is an email received from an unknown recipient, the content of the email message may be parsed to determine the likelihood of the email being spam and/or a phishing mail. This may involve using one or more machine learning processes, such as natural language processes to parse words, phrases, hyperlinks/uniform resource locators, and other features of the message. The data models used by the analysis may be machine learning models, stored remotely to the recipient's device, or stored locally on the recipient's device for use offline, capable of providing one or more probability values.

Once the data package has been analysed the method 600 progresses to step 630 where a risk indicator is generated. The risk indicator is based on the analysis undertaken at step 630, and the probability values generated. The risk indicator is indicative of a risk associated with the analysis of the data package. The analysis may be based on a plurality of data points associated with the sender and the relationship between the data points. For example, where a sender is sending a data package to a recipient, and there is no previous interaction between the two, the result of the analysis at step 630 may be that receiving the package is high risk. Another example, maybe where there is information relating to previous interactions between the sender and recipient, however not at the transmission time. In such a case, a data model may be used to determine what the likelihood is of a sender sending a data package to a recipient, at a particular time, and/or the recipient accessing a data package, at a particular time. For example, in some embodiments, if a recipient was to very rarely work from home, for example, it would be unlikely that a sender would send a data package during working hours to an IP address of the recipient, where the IP address is the recipient's home IP address. In such a case the data models may indicate that receiving a data package based on these characteristics may also be high risk. Alternatively, if the sender was to send the data package to the recipient at an office IP address during office hours, then the risk score generated may be lower as this would be expected behaviour. In yet a further example, where it is determined that the payload data 120 comprises data relating to an email message which is a spam or phishing message the risk score generated may indicate that the received data package high risk.

In other embodiments, the risk score may be determined based on whether it would be likely for a recipient to receive a data package at a particular time, with a particular destination IP address. For example, if a recipient were to rarely work from home, it would be unlikely that they would access a data package during working hours from their home IP address. In such a case the data models may indicate that receiving/accessing the data package based on a destination IP address of the data package corresponding to their home IP address (or indeed any unknown domain (which can be resolved to an IP address)) may be high risk. Conversely, if the recipient were to receive the data package at an office IP address during work hours, the data models may indicate that receiving/accessing the data package is lower risk as this behaviour would be expected. Where it is determined that the recipient accessing the data package is high risk, the data package may be encrypted prior to being made available to the recipient, or alternatively the recipient may be notified that there is a data package available for him to access and require the recipient to enter a username and password, or verify their identity in order to access it. This helps prevent fraudulent and/or anomalous access of the data package by a malicious user.

Where there are no data points associated with a particular sender, or sender identifier, more general data points, such as data points associated with the sender's domain and/or domain of the recipient of the data package may be used.

Determining what and how may data models to use when analysing the data package, may be based on the amount of information available for the system to analyse. Where there is not much information regarding a particular interaction or type of data package, for example, a simple model may be used. Conversely, where there is a large amount of information a more complex model may be employed. To determine at which point to move from a simpler to more complex model, a clustering algorithm may be used to cluster the information and determine at which point to move to a more complex level based on an inter-cluster distance. The clustering algorithm may be a k-means clustering algorithm or a peak-finding method. The peak finding method may calculate a density histogram with various bin widths, an average number of peaks in the density histogram may be rounded to the nearest whole number and used as the number of clusters for determining the complexity level, and as such the probability values to use when determining the combined probability value. The complexity level may be determined by generating a silhouetting metric based on the inter-cluster distance, such that the larger the inter-cluster distance the more defined the clusters are. For each of the different levels of complexity, the clustering algorithm may be used to determine clusters of the information and determine which level of complexity provides the highest silhouetting metric, and hence the most defined clusters. Based on these clusters, groups of data models may be used to generate the risk score.

Once the risk score has been generated, the method 600 progresses to step 640, a handling action is produced based on the risk indicator. There may be any number of handling actions produced at this stage, including handling actions for decrypting the data package, notifying the recipient, or any other handling action as will be appropriate to the skilled person. For example, where it is determined that the payload data of a data package is a spam or phishing message, one handing action provided to the recipient's device may be capable of analysing the text of the message, detecting any hyperlinks and stripping them from the message, thereby preventing the recipient from accessing the hyperlinks. Similarly, if the spam/phishing message has an associated attachment, this may be removed from the message. In such a case, the handling action may quarantine the email message, and provide the hyperlinks and attachments to a checking service for determining whether the linked location or file poses any threat to the recipient. The checking service may be remote to the recipient's device. If the checking service determines that the links are not a threat to the recipient, the message containing the links may be made available to the recipient. Once the handling action has been determined, the method progresses to step 650 where the data package and the handling action are made available to the recipient.

Some functionality of the method 600 may be undertaken on the recipient's device, or alternatively it may be undertaken on a remote device, such as the system 200 described above in relation to FIGS. 2 and 3, whereby determining the risk indicator and a handling action to apply may be undertaken by the decision-making module 250, of system 200. In other embodiments, the remote device may be an email server or other external device capable of determining a handling action to apply to the data package 100. By undertaking the method 600 on a remote server, this prevents the recipient being made aware of any delay caused by the analysis of the data package 100. The recipient receives the data package 100 following the analysis along with the handling action, and as such does not perceive any delay caused by the analysis. In some embodiments, it may be desirable for the handling action to be applied to the data package at the remote service. For example, if the risk indicator determines that the data package contains a spam/phishing email with a number of hyperlinks or attachments, maintaining this information on the server, in a quarantined location, ensures the recipient's device is not compromised.

The method 600 may be used for analysing a data package 100 received by an addressed recipient using the system 200 described above in accordance with FIGS. 2 and 3. Aspects of the system 200 may form part of a recipient's device or a remote device communicably coupled to the recipient device via a data network 230.

The above embodiments are to be understood as illustrative examples of the disclosure. Further embodiments of the disclosure are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A method for analysing data received by an addressed recipient of a data package, the method comprising the steps of:

receiving a data package over a data network, the data package comprising a header and payload data temporarily storing the data package in temporary storage;

analysing, at a first time, the header of the data package to determine a plurality of characteristics, the plurality of characteristics comprising at least an identifier and a transmission time and determining, using at least one data model, at least one probability value associated with a relationship between the plurality of characteristics;

generating a risk indicator, based on the at least one probability value;

generating a handling action based on the risk indicator;

providing the payload data and the handling action to the addressed recipient; and determining whether to update the at least one data model at the first time based at least in part on whether the risk indicator is being generated at the first time, and based on the determination:

updating the at least one data model based on the data package when it is determined that the at least one data model should be updated at the first time; and retrieving the at least one data package from temporary storage, and updating, at a second time later than the first time, the at least one data model, when it is determined that the at least one data model should not be updated at the first time, and the risk indicator has been generated at the first time.

2. The method for analysing data received by an addressed recipient of a data package according to claim 1, wherein the number of criteria used in the step of analysing the header is dependent on a plurality of data points associated with the identifier, such that the number of criteria used is based on at least one predefined relationship between the data points.

3. The method for analysing data received by an addressed recipient of a data package according to claim 2, wherein the predefined relationship is based on any of Monte Carlo data generation algorithm, a k-means clustering algorithm, a machine learning model, an expert system, or a peak finding algorithm.

4. The method for analysing data received by an addressed recipient of a data package according to claim 2, wherein if there are no data points associated with the identifier, data points relating to a domain associated with the identifier are used.

5. The method for analysing data received by an addressed recipient of a data package according to claim 1, wherein generating the risk indicator comprises obtaining additional information from at least one additional data source and processing the additional information along with the analysis of the header.

6. The method for analysing data received by an addressed recipient of a data package according to claim 1, wherein generating the risk indicator comprises at least one machine learning function.

7. The method for analysing data received by an addressed recipient of a data package according to claim 1, further comprising the steps of:
   determining whether the payload data of the data package is encrypted; and
   decrypting the payload data based on the handling action.

8. The method for analysing data received by an addressed recipient of a data package according to claim 1, wherein the handling action comprises a flag arranged to indicate at least the risk indicator to the addressed recipient.

9. A system for analysing data received by an addressed recipient of a data package, the system comprising:
   temporary storage for storing a data package received via a data network, the data package comprising a header and payload data;
   an analysis module for analysing, at a first time, the header of the data package based on a plurality of characteristics, the plurality of characteristics comprising at least an identifier and a transmission time, and for determining, using at least one data model, at least one probability value associated with a relationship between the plurality of characteristics;
   a risk indication module for generating a risk indicator based on the at least one probability value;
   an action generation module for generating a handling action based on the risk indicator;
   an output module for providing the payload data and the handling action to the addressed recipient;
   a monitoring unit for determining whether to update the at least one data model at the first time based at least in part on whether the risk indicator is being generated at the first time; and
   an updating module for:
      updating the at least one data model based on the data package when it is determined that the at least one data model should be updated at the first time; and
      retrieving the at least one data package from the temporary storage, and updating, at a second time later than the first time, the at least one data model the generation of the risk indicator, and the risk indicator has been generated at the first time.

10. The system for analysing data received by an addressed recipient of a data package according to claim 9, wherein the number of criteria used by the analysis module is dependent on a plurality of data points associated with the sender, such that the number of criteria used is based on at least one predefined relationship between the data points.

11. The system for analysing data received by an addressed recipient of a data package according to claim 10, wherein if there are no data points associated with the identifier, data points relating to a domain associated with the identifier are used.

12. The system for analysing data received by an addressed recipient of a data package according to claim 9, wherein the risk indication module obtains additional information from at least one additional data source and processes the additional information along with the analysis of the header.

13. The system for analysing data received by an addressed recipient of a data package according to claim 9, wherein the analysis module comprises a processor.

14. The system for analysing data received by an addressed recipient of a data package according to claim 9, wherein the processor is a machine learning processor.

15. The system for analysing data received by an addressed recipient of a data package according to claim 9, further comprising:
   an encryption detection module for detecting whether the payload data of the data package is encrypted; and
   a decryption module for decrypting the payload data based on the handling action; wherein the output module provides the decrypted payload data and handling action to the addressed recipient.

16. A non-transitory computer-readable storage medium comprising a set of computer-readable instructions stored thereon which, when executed by at least one processor cause the processor to analyse data received by an addressed recipient of a data package, the instructions comprising:
   receiving a data package over a data network, the data package comprising a header and payload data;
   temporarily storing the data package in temporary storage;
   analysing, at a first time, the header of the data package to determine a plurality of characteristics, the plurality of characteristics comprising at least an identifier and a transmission time and for determining, using a data model at least one probability value associated with a relationship between the plurality of characteristics;
   generating a risk indicator based on the at least one probability value;
   generating a handling action based on the risk indicator;
   providing the payload data and the handling action to the addressed recipient; and
   determining whether to update the at least one data model at the first time based at least in part on whether the risk indicator is being generated at the first time, and based on the determination:
      updating the at least one data model based on the data package when it is determined that the at least one data model should be updated at the first time; and
      retrieving the at least one data package from temporary storage, and updating, at a second time later than the first time, the at least one data model, when it is determined that the at least one data model should not be updated at the first time, and the risk indicator has been generated at the first time.

* * * * *